US010247961B2

(12) United States Patent
Moine et al.

(10) Patent No.: US 10,247,961 B2
(45) Date of Patent: Apr. 2, 2019

(54) METHOD OF LOCALLY THICKENING AN OPHTHALMIC LENS

(71) Applicant: Essilor International, Charenton-le-Pont (FR)

(72) Inventors: Jérôme Moine, Charenton-le-Pont (FR); Jean Sahler, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 207 days.

(21) Appl. No.: 14/785,810

(22) PCT Filed: Apr. 16, 2014

(86) PCT No.: PCT/EP2014/057775
§ 371 (c)(1),
(2) Date: Oct. 20, 2015

(87) PCT Pub. No.: WO2014/177386
PCT Pub. Date: Nov. 6, 2014

(65) Prior Publication Data
US 2016/0091733 A1 Mar. 31, 2016

(30) Foreign Application Priority Data

Apr. 29, 2013 (EP) .................................... 13305560

(51) Int. Cl.
*G02C 3/00* (2006.01)
*G02C 7/00* (2006.01)
(Continued)

(52) U.S. Cl.
CPC ........ *G02C 7/027* (2013.01); *B29D 11/00961* (2013.01); *G02C 7/02* (2013.01);
(Continued)

(58) Field of Classification Search
CPC .......... G02C 7/02; G02C 7/024; G02C 7/027; G02C 1/02; G02C 1/06; G02C 5/10;
(Continued)

(56) References Cited

U.S. PATENT DOCUMENTS 4,762,406 A * 8/1988 Steiner ................... G02C 1/023
351/128
2005/0206840 A1 9/2005 Roscini
(Continued)

FOREIGN PATENT DOCUMENTS

FR 2 910 645 6/2008
WO WO 85/02689 6/1985

*Primary Examiner* — Mustak Choudhury
(74) *Attorney, Agent, or Firm* — Oblon, McClelland, Maier & Neustadt, L.L.P.

(57) ABSTRACT

Method implemented by computer means for determining an ophthalmic lens adapted to a wearer and to a spectacle frame, the method comprising: providing wearer data comprising the wearer's ophthalmic prescription, providing mounting data comprising at least the tie points of the ophthalmic lens to be mounted in the spectacle frame, providing thickness requirement data comprising the minimum thickness of the ophthalmic lens at the tie points, determining ophthalmic lens data based on the wearer data, the ophthalmic lens data comprising the two optical surfaces of the ophthalmic lens and their relative positions, an oversize creating step (S5), during which the ophthalmic lens determined during the ophthalmic lens data determining step is locally thickened by creating an oversize at the tie points, so that the thickness of the ophthalmic lens at the tie points is greater than or equal to the minimum thickness.

10 Claims, 4 Drawing Sheets

(51) Int. Cl.
*G02C 7/02* (2006.01)
*B29D 11/00* (2006.01)
*G02C 1/02* (2006.01)
*G02C 1/06* (2006.01)

(52) U.S. Cl.
CPC ............... *G02C 7/024* (2013.01); *G02C 1/02* (2013.01); *G02C 1/06* (2013.01)

(58) Field of Classification Search
CPC ........ G02C 13/001; G02C 1/023; G02C 5/00; G02C 5/02; G02C 5/04; G02C 5/045; G02C 5/06; G02C 5/122; G02C 5/124; G02C 5/143; G02C 5/2263; G02C 11/00; G02C 5/20; B29D 11/00961; G01B 5/06; G01B 5/20; B24B 13/0055; B24B 9/14; B24B 9/146; B24B 49/00; G05B 19/41875

USPC ............... 351/41, 44, 121, 110, 140, 159.52, 351/159.75, 178, 176, 177, 246, 128, 137, 351/154; 382/141, 291; 700/108–110; 408/22; 33/700
See application file for complete search history.

(56) References Cited

U.S. PATENT DOCUMENTS

| | | |
|---|---|---|
| 2009/0027617 A1 | 1/2009 | Anger et al. |
| 2009/0067940 A1* | 3/2009 | Arai ................... B24B 9/14 408/22 |
| 2010/0092068 A1* | 4/2010 | Pinault ................ B24B 9/146 382/141 |

* cited by examiner

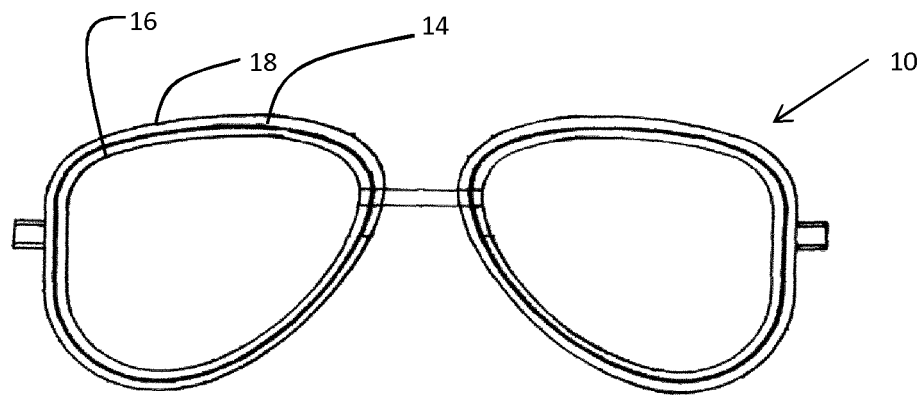
Fig. 2
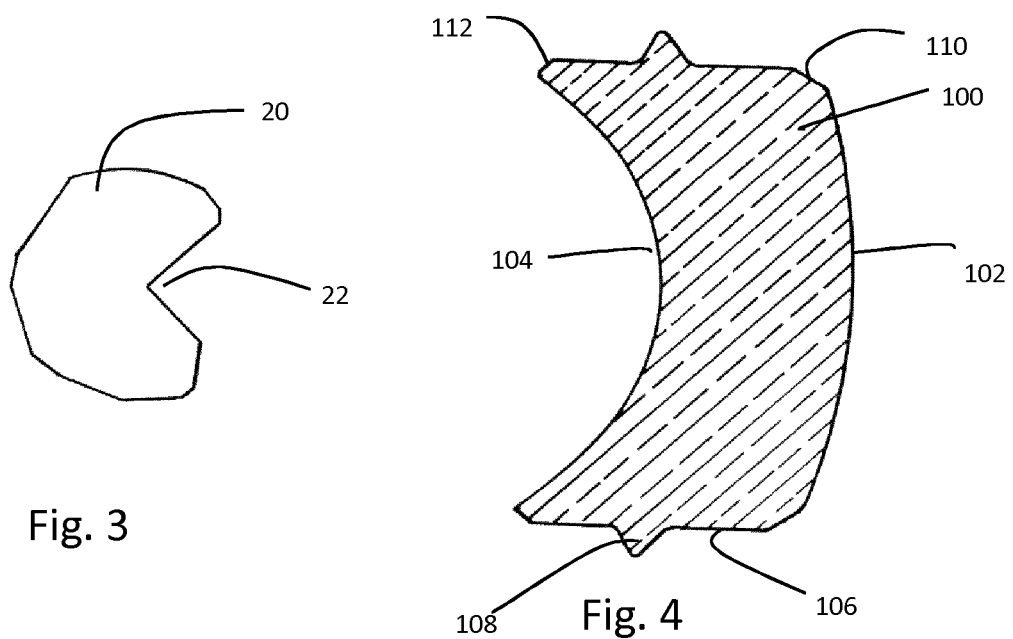
Fig. 3
Fig. 4

METHOD OF LOCALLY THICKENING AN OPHTHALMIC LENS

RELATED APPLICATIONS

This is a U.S. national stage application under 35 USC § 371 of International application No. PCT/EP2014/057775, filed on Apr. 16, 2014. This application claims the priority of European application no. 13305560.8 filed Apr. 29, 2013, the entire content of which is hereby incorporated by reference.

FIELD OF THE INVENTION

The invention relates to a method implemented by computer means for determining an ophthalmic lens adapted to a wearer and to a spectacle frame, to a method of manufacturing such ophthalmic lens and to a computer program product.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

Usually, a person needing to wear spectacles and having thus a prescription filled by an ophthalmologist goes to the premise of an optician for choosing a spectacle frame. The future wearer of the spectacle frame may try several spectacle frames and finally chooses one of the tried frames. The optician orders a pair of lenses corresponding to the wearer's prescription. The lenses sent to the optician are designed and manufactured according to optical criteria.

Depending on the service provided by the lens manufacturer, the optician may have to cut the lenses to fit the spectacle frame the person has chosen or in case of "remote edging" service the optician receives the lenses already cut and only has to fit them in the spectacle frame.

The geometrical characteristics of the chosen spectacle frame can be measured very precisely by a measuring device, for example a mechanical sensor or be provided via a data base.

The geometrical characteristics of the chosen spectacle frame make it possible to provide ophthalmic lenses which fit the chosen spectacle frame, on the one hand, and the wearer prescription, on the other hand.

The lenses provider has to ensure that the provided lenses are adapted to the wearer prescription and to the chosen spectacle frame. So as to fit and be mounted in the chosen spectacle frame, the ophthalmic lens has to fulfill a number of mounting requirements. Among such mounting requirements, the thickness of the ophthalmic lens at the tie points of the ophthalmic lens to be mounted in the spectacle frame is of great importance.

Conventionally, the lens provider calculates the ophthalmic lenses based on optical criteria, in particular the wearer's prescription. So as to limit weight of the ophthalmic lens, the lens provider optimizes the lens to as to provide the thinner ophthalmic lenses as possible.

However, so as to respect the thickness requirements of the chosen spectacle frame, the lens provider is usually required to globally oversize the ophthalmic lens; thus providing ophthalmic lenses that are thicker and heavier than initially optimized by the lens provider.

SUMMARY OF THE INVENTION

One object of the invention is to provide an ophthalmic lens adapted to a wearer and a chosen spectacle frame and as light as possible.

In accordance with a first aspect of the invention there is provided a method, for example implemented by computer means, for determining an ophthalmic lens adapted to a wearer and to a spectacle frame, the method comprising:
 a wearer data providing step, during which wearer data comprising at least the wearer's ophthalmic prescription is provided,
 a mounting data providing step, during which mounting data is provided, the mounting data comprising at least the tie points of the ophthalmic lens to be mounted in the spectacle frame,
 a thickness requirement data providing step, during which thickness requirement data is provided, the thickness requirement data comprising the minimum thickness of the ophthalmic lens at the tie points so as to be mounted in the spectacle frame,
 an ophthalmic lens data determining step, during which ophthalmic lens data is determined based on the wearer data, the ophthalmic lens data comprising at least the two optical surfaces of the ophthalmic lens and the relative positions of the two optical surfaces of the ophthalmic lens,
 an oversize creating step, during which the ophthalmic lens determined during the ophthalmic lens data determining step is locally thicken by creating an oversize at the tie points, the oversize being determined so that the thickness of the ophthalmic lens at the tie points is greater than or equal to the minimum thickness.

Advantageously, the method according to an embodiment of the invention oversizes the ophthalmic lens only locally around the tie points, thus providing an ophthalmic lens adapted to the wearer's prescription that can be mounted in the chosen spectacle frame and that is much lighter than the ophthalmic lenses provided with the prior art methods.

According to further embodiments which can be considered alone or in combination:
 the ophthalmic lens is a positive ophthalmic lens; and/or
 during the oversize creating step the oversize is applied on the back surface of the ophthalmic lens; and/or
 during the oversize creating step the oversize is shared between the front and back surfaces of the ophthalmic lens; and/or
 the spectacle frame is a rim frame and the mounting data comprises the rim shape; and/or
 the tie points are part of the bevel to be edged to the ophthalmic lens so as to be mounted in the spectacle frame; and/or
 the spectacle frame is a rimless frame and the mounting data comprises the mounting points of the spectacle frame; and/or
 the tie points correspond to the drilling points of the ophthalmic lens to be mounted in the spectacle frame; and/or
 the oversize creating step the ophthalmic lens is thicken over a zone greater than or equal to 2 mm and smaller than or equal to 5 mm around each tie point; and/or
 the oversize is determined so that the thickness of the ophthalmic lens at the tie points after the oversize creating step is greater than or equal to 1 mm.

Another aspect of the invention relates to a method of manufacturing an ophthalmic lens adapted to a wearer and to a spectacle frame, the method comprising:

an ophthalmic lens data providing step, during which ophthalmic lens data is provided, a spectacle frame data providing step, during which spectacle frame data is provided, the spectacle frame data comprising at least the shape of the spectacle frame and mounting data, a manufacturing step during which the an ophthalmic lens is manufactured according to the ophthalmic lens data, a oversize creating step during which the manufactured ophthalmic lens is locally thicken by locally adding an oversize, wherein the ophthalmic lens data and the oversize are determined using a method according to the invention.

According to further embodiments which can be considered alone or in combination:

the oversize creating step is implemented by an additive method; and/or the oversize creating step is implemented by a subtractive method; and/or the method further comprises an edging step during which the ophthalmic lens is edged according to the spectacle frame data.

According to a further aspect, the invention relates to a computer program product comprising one or more stored sequences of instructions that are accessible to a processor and which, when executed by the processor, causes the processor to carry out the steps of the method according to the invention.

Another aspect of the invention relates to a computer readable medium carrying one or more sequences of instructions of the computer program product according to the invention.

Another aspect of the invention relates to a program which makes a computer execute the method of the invention.

Another aspect of the invention relates to a computer-readable storage medium having a program recorded thereon; where the program makes the computer execute the method of the invention.

Another aspect of the invention relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawings in which:

FIG. 2 is a front view of a closed rim spectacle frame, FIG. 3 is a cross section of the spectacle frame represented on FIG. 2, FIG. 4 represents a cross section of an ophthalmic lens edged to fit a closed spectacle frame rim.

DETAILED DESCRIPTION OF THE DRAWINGS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Figure 1:
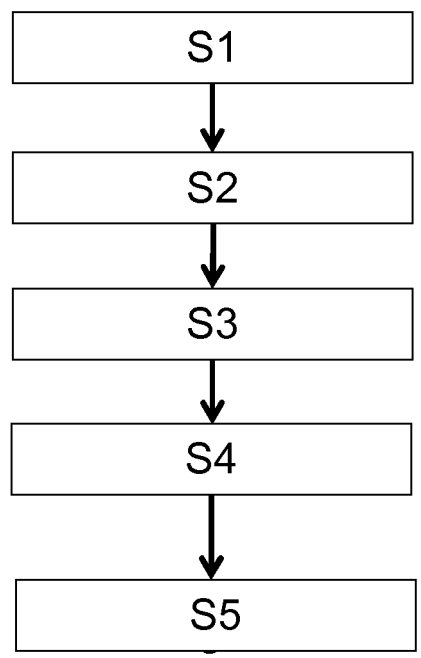
FIG. 1 is flowchart representing the steps of a method according to an embodiment of the invention.

The invention relates to a method, for example implemented by computer means, for determining an ophthalmic lens adapted to a wearer and to a spectacle frame. As illustrated on FIG. 1, the method comprises:

a wearer data providing step S1, a mounting data providing step S2, a thickness requirement data providing step S3, an ophthalmic lens data determining step S4, and an oversize creating step S5.

During the wearer data providing step S1, wearer data is provided. The wearer data comprise at least the wearer's prescription.

The wearer's prescription is to be understood as a set of optical characteristics of optical power, of astigmatism and, where relevant, of addition, determined by an ophthalmologist in order to correct the vision defects of the wearer, for example by means of a lens positioned in front of his eye. The term 'astigmatism' is used to denote the data pair formed by an amplitude value and a value of angle.

Although this is an abuse of language, it is also sometimes used to denote the amplitude of the astigmatism only. The context allows those skilled in the art to understand which usage of the term is intended. Generally speaking, the prescription for a progressive lens comprises values of optical power and of astigmatism at the distance-vision point and, where appropriate, an addition value.

The wearer data may comprise other information relating to the wearer that may be used to determine the characteristics of the ophthalmic lens the most adapted to the wearer.

Mounting data is provided during the mounting data providing step S2. The mounting data comprises at least the tie points of the ophthalmic lens to be mounted in the spectacle frame chosen by the wearer.

The tie points correspond to the points of the ophthalmic lens on which the spectacle frame is to be fixed when mounting the ophthalmic lens in the spectacle frame.

Unless specifically stated otherwise, the method according to the invention may apply to any type of spectacle frame, for example metal frames, plastic frames, combination frames, semi-rimless frames, full rim frames, Nylor frames, rimless frames etc. . . . .

According to an embodiment of the invention, the spectacle frame is a rim frame as illustrated on FIG. 2.

FIG. 2 shows a representation of a spectacle frame 10. FIG. 2 shows for the frame 10 the contour of the lens in thick lines 14, and in thin lines the internal 16 and external 18 limits of the spectacle frame 10.

The contour of the bottom of the groove of the spectacle frame, is called the template of the spectacle frame. The template is therefore the external shape that the lens must have once cut out in order to fit in the frame spectacle.

FIG. 3 show cross section of a rim of a spectacle frame. The rim 20 on FIG. 3 has a V-shaped groove 22, usually corresponding to metal or plastic closed spectacle frame. The lens to be fitted in such closed spectacle frame is beveled so as to have a corresponding A-shaped bevel (inverse V shape), as represented on FIG. 4.

FIG. 4 shows a cross section of an edged and beveled ophthalmic lens 100. Such ophthalmic lens presents a front face 102, a rear face 104 and an external periphery 106.

The rear face 104 is the face the closest to the eye of the wearer when the ophthalmic lens is fitted on the frame. Usually for a positive ophthalmic lens, the rear face 104 is concave and the front face 102 is convex.

The external periphery 106 is processed during the edging and beveling steps. As represented on FIG. 4 the external periphery presents fitting means, in this case a bevel 108. As discussed previously, the geometry of the bevel, in particular its position and shape, depends on the spectacle frame in which the ophthalmic lens is to be fitted. According to an embodiment of the invention, the tie points comprised in the mounting data are part of the bevel 108, for example the tie points are distributed over the bevel shape.

Optionally, the external periphery of the lens can present a front face counter bevel 110 and a rear face counter bevel 112.

As illustrated on FIG. 4, the external periphery 106 of the ophthalmic lens has to be thick enough to support the bevel 108.

According to a further embodiment of the invention, the spectacle frame may be a rimless frame and the mounting data comprises the mounting points of the spectacle frame.

Figure 5:
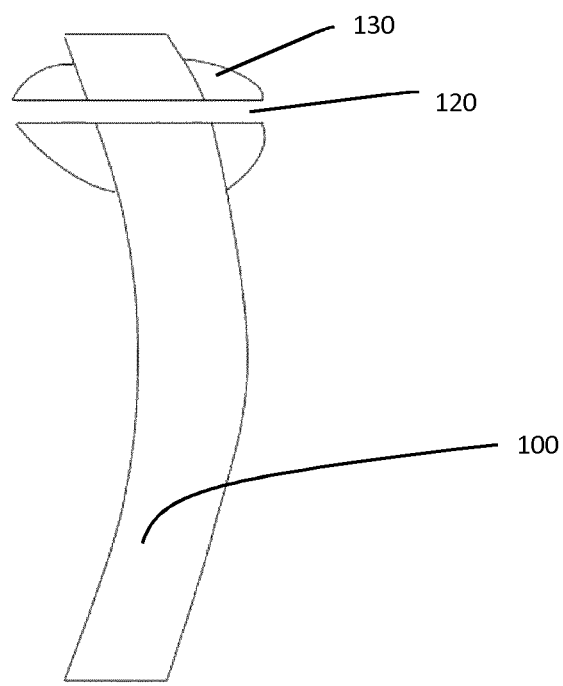
FIG. 5 represents a cross section of an ophthalmic lens drilled to fit a rimless spectacle frame rim.

FIG. 5 shows a cross section of an ophthalmic lens 100 arranged to be mounted in a rimless frame. The ophthalmic lens 100 comprises a hole 120 arranged to fix the ophthalmic lens to the rimless frame.

The ophthalmic lens has to be thick enough around the hole 120 to resist to the drilling operation and to provide mechanical resistance of the ophthalmic lens when mounted in the spectacle frame.

According to such embodiment, the tie points correspond to the drilling points of the ophthalmic lens to be mounted in the spectacle frame.

During the thickness requirement data providing step S3, thickness requirement data is provided. The thickness requirement data comprises the minimum thickness of the ophthalmic lens at the tie points so as to be mounted in the spectacle frame.

According to an embodiment of the invention, the minimum thickness of the ophthalmic lens at the tie points is greater than or equal to 1 mm, for example greater than or equal to 1.5 mm.

Ophthalmic lens data is determined based on the wearer data during the ophthalmic lens data determining step S4.

The ophthalmic lens data comprises at least the two optical surfaces of the ophthalmic lens and the relative positions of the two optical surfaces of the ophthalmic lens.

The ophthalmic lens data is determined using by any means known of the person skilled in the art, for example using optimization methods.

For esthetic consideration and to reduce the weight of the ophthalmic lens, the optical surfaces of the ophthalmic lens and there relative positions are determined so as to reduce the overall thickness of the ophthalmic lens.

As indicated previously, the reduction of overall thickness may provide, in particular in cases of positive ophthalmic lenses, a thickness at the edge of the ophthalmic lens that is too small to edge a bevel or to drill holes.

During the oversize creating step S5, the ophthalmic lens is locally thicken by creating an oversize around the tie points. The oversizes are determined so that the thickness of the ophthalmic lens around the tie points is greater than or equal to the minimum thickness.

The oversizes may be applied either on the back surface of the ophthalmic lens and/or on the front surface of the ophthalmic lens. The position of the oversized may be decided based on esthetic reasons or so as to reduce the deformation of the spectacle frame when fitting the ophthalmic lens in the spectacle frame.

According to an embodiment of the invention, the ophthalmic lens is thicken over a zone greater than or equal to 2 mm and smaller than or equal to 5 mm around each tie point.

Figure 6A:
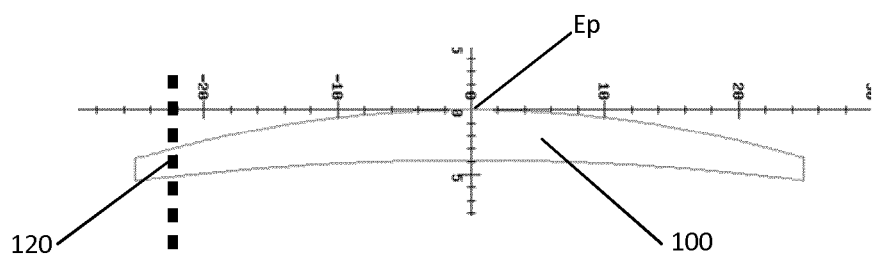
FIGS. 6a and 6b represent ophthalmic lenses to be fitted in a rimless spectacle frame rim, obtained respectively by a prior art method and the method according to an embodiment of the invention.

FIG. 6a represents an ophthalmic lens 100 of +4 diopters calculated according to a prior art method. The ophthalmic lens 100 is adapted to be mounted in a rimless frame. The minimum thickness requirement at the drilling point 120 is of 2 mm. To obtain such thickness at the drilling point the overall thickness of the optical lens has been increased to obtain a thickness at the center point Ep of 3.9 mm. The weight of the optical lens is of 5.2 g.

Figure 6B:
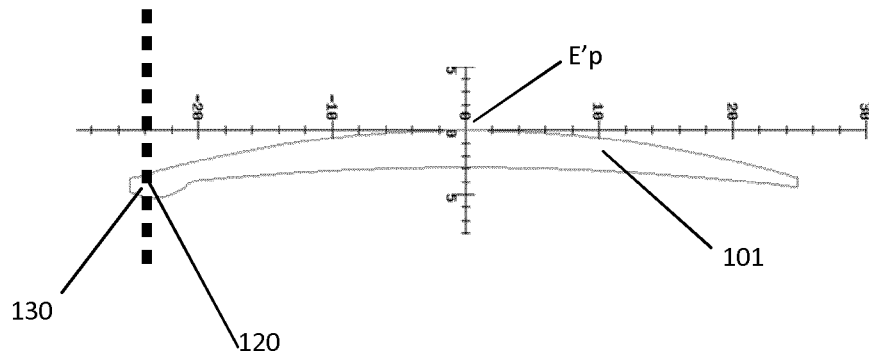

FIG. 6b represents an optimized ophthalmic lens 101 obtained according to a method of the invention. The optimized ophthalmic lens 101 of FIG. 6b has the same optical function as the ophthalmic lens 100 of FIG. 6a. The thickness at the center point Ep' of the optimized ophthalmic lens 101 is of 2.9 mm.

An oversize 130 is created at the drilling point 120 so as to have a thickness of 2 mm around the drilling point.

Having the oversize of the optimized optical lens localized around the drilling point allows having an optimized optical lens of 3.5 g.

Therefore, the weight of the optimized ophthalmic lens is 33% smaller than the weight of the ophthalmic lens obtained by the prior art method.

Figure 7A:
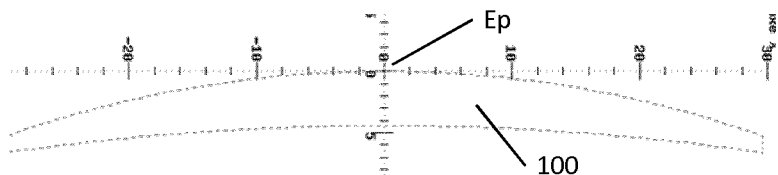
FIGS. 7a and 7b represent ophthalmic lenses to be fitted in closed rim spectacle frame, obtained respectively by a prior art method and the method according to an embodiment of the invention.

FIG. 7a represents an ophthalmic lens 100 of +4 diopters calculated according to a prior art method. The ophthalmic lens 100 is adapted to be mounted in a rim frame. The minimum thickness requirement at the periphery of the lens is of 2 mm. To obtain such thickness at the periphery, the overall thickness of the optical lens has been increased to obtain a thickness at the center point Ep of 4.4 mm. The weight of the optical lens is of 10.5 g.

Figure 7B:
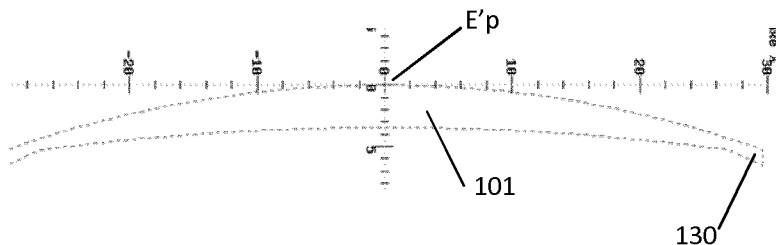

FIG. 7b represents an optimized ophthalmic lens 101 obtained according to a method of the invention. The optimized ophthalmic lens 101 of FIG. 7b has the same optical function as the ophthalmic lens 100 of FIG. 7a. The thickness at the center point Ep' of the optimized ophthalmic lens 101 is of 3.4 mm.

An oversize 130 is created at the periphery of the ophthalmic lens so as to have a thickness of 2 mm at the periphery.

Having the oversize of the optimized optical lens localized at the periphery allows having an optimized optical lens of 7.3 g.

Therefore, the weight of the optimized ophthalmic lens is 30% smaller than the weight of the ophthalmic lens obtained by the prior art method.

The invention also relates to a method of manufacturing an ophthalmic lens adapted to a wearer and a spectacle frame, the method comprising:
an ophthalmic lens data providing step,
a spectacle frame data providing step,
a manufacturing step.

During the ophthalmic lens data providing step, ophthalmic lens data is provided. The ophthalmic lens data comprises at least the two optical surfaces of the ophthalmic lens and the relative positions of the two optical surfaces of the ophthalmic lens. The ophthalmic lens data have been determined according to a method of the invention.

During the spectacle frame data providing step which spectacle frame data is provided. The spectacle frame data comprises at least the shape of the spectacle frame and mounting data.

An ophthalmic lens is manufactured according to the ophthalmic lens data and a determined oversize during the manufacturing step.

The oversize is determined according to a method of the invention. According to an embodiment of the invention, the manufacturing step may further comprise an oversize creating step implemented by an additive method, such as additive manufacturing during which the manufactured ophthalmic lens is locally thicken by locally adding an oversize.

According to a further embodiment of the invention, the manufacturing step may be implemented by a subtractive method, such as machining, surfacing or any other subtractive method known of the skilled person.

The method of manufacturing an ophthalmic lens according to the invention may further comprise an edging step during which the ophthalmic lens is edged according to the spectacle frame data.

The invention has been described above with the aid of embodiments without limitation of the general inventive concept.

While in the embodiments described it is suggested that the back surface of the optical lens is formed by a machining process, it will be understood, that in alternative embodiments of the invention both or either surfaces of the lens may be formed by a machining process.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by processing circuitry for determining an ophthalmic lens adapted to a wearer and to a spectacle frame, the method comprising:
a wearer data obtaining step performed by the processing circuitry, during which wearer data comprising at least the wearer's ophthalmic prescription is obtained;
a mounting data obtaining step performed by the processing circuitry, during which mounting data is obtained, the mounting data comprising at least tie points of the ophthalmic lens to be mounted in the spectacle frame;
a thickness requirement data obtaining step performed by the processing circuitry, during which thickness requirement data is obtained, the thickness requirement data comprising minimum thickness of the ophthalmic lens at the tie points so as to be mounted in the spectacle frame;
an ophthalmic lens data determining step performed by the processing circuitry, during which ophthalmic lens data is determined based on the wearer data, the ophthalmic lens data comprising at least two optical surfaces of the ophthalmic lens and relative positions of the two optical surfaces of the ophthalmic lens; and
an oversize creating step performed by the processing circuitry, during which the ophthalmic lens determined during the ophthalmic lens data determining step is locally thickened by creating an oversize at the tie points, the oversize being determined so that the thickness of the ophthalmic lens at the tie points is greater than or equal to the minimum thickness, wherein
during the oversize creating step, for each tie point the ophthalmic lens is thickened on a front surface or on a back surface over a zone around the tie point, each zone extending on the corresponding surface over a radius greater than or equal to 2 mm and smaller than or equal to 5 mm around the tie point.

2. The method according to claim 1, wherein the ophthalmic lens is a positive ophthalmic lens.

3. The method according to claim 1 wherein during the oversize creating step the oversize is applied on the back surface of the ophthalmic lens.

4. The method according to claim 1, wherein during the oversize creating step the oversize is shared between the front surface and the back surface of the ophthalmic lens.

5. The method according to claim 1, wherein the spectacle frame is a rim frame and the mounting data comprises a rim shape.

6. The method according to claim 5, wherein the tie points are part of a bevel to be edged to the ophthalmic lens so as to be mounted in the spectacle frame.

7. The method according to claim 1, wherein the spectacle frame is a rimless frame and the mounting data comprises mounting points of the spectacle frame.

8. The method according to claim 7, wherein the tie points correspond to drilling points of the ophthalmic lens to be mounted in the spectacle frame.

9. The method according to claim 1, wherein the oversize is determined so that the thickness of the ophthalmic lens at the tie points after the oversize creating step is greater than or equal to 1 mm.

10. A computer program product comprising one or more stored sequences of instructions that are stored on a non-transitory memory and that accessible to a processor and which, when executed by the processor, causes the processor to perform a method, the method comprising:

obtaining wearer data comprising at least wearer's ophthalmic prescription;

obtaining mounting data, the mounting data comprising at least tie points of an ophthalmic lens to be mounted in a spectacle frame;

obtaining thickness requirement data, the thickness requirement data comprising a minimum thickness of the ophthalmic lens at the tie points so as to be mounted in the spectacle frame;

determining ophthalmic lens data based on the wearer data, the ophthalmic lens data comprising at least two optical surfaces of the ophthalmic lens and relative positions of the two optical surfaces of the ophthalmic lens; and locally thickening the ophthalmic lens determined during the determining by creating an oversize at the tie points, the oversize being determined so that thickness of the ophthalmic lens at the tie points is greater than or equal to the minimum thickness, wherein during the locally thickening, for each tie point the ophthalmic lens is thickened on a front surface or on a back surface over a zone around the tie point, each zone extending on the corresponding surface over a radius greater than or equal to 2 mm and smaller than or equal to 5 mm around the tie point.

* * * * *